United States Patent Office 3,302,293
Patented Feb. 7, 1967

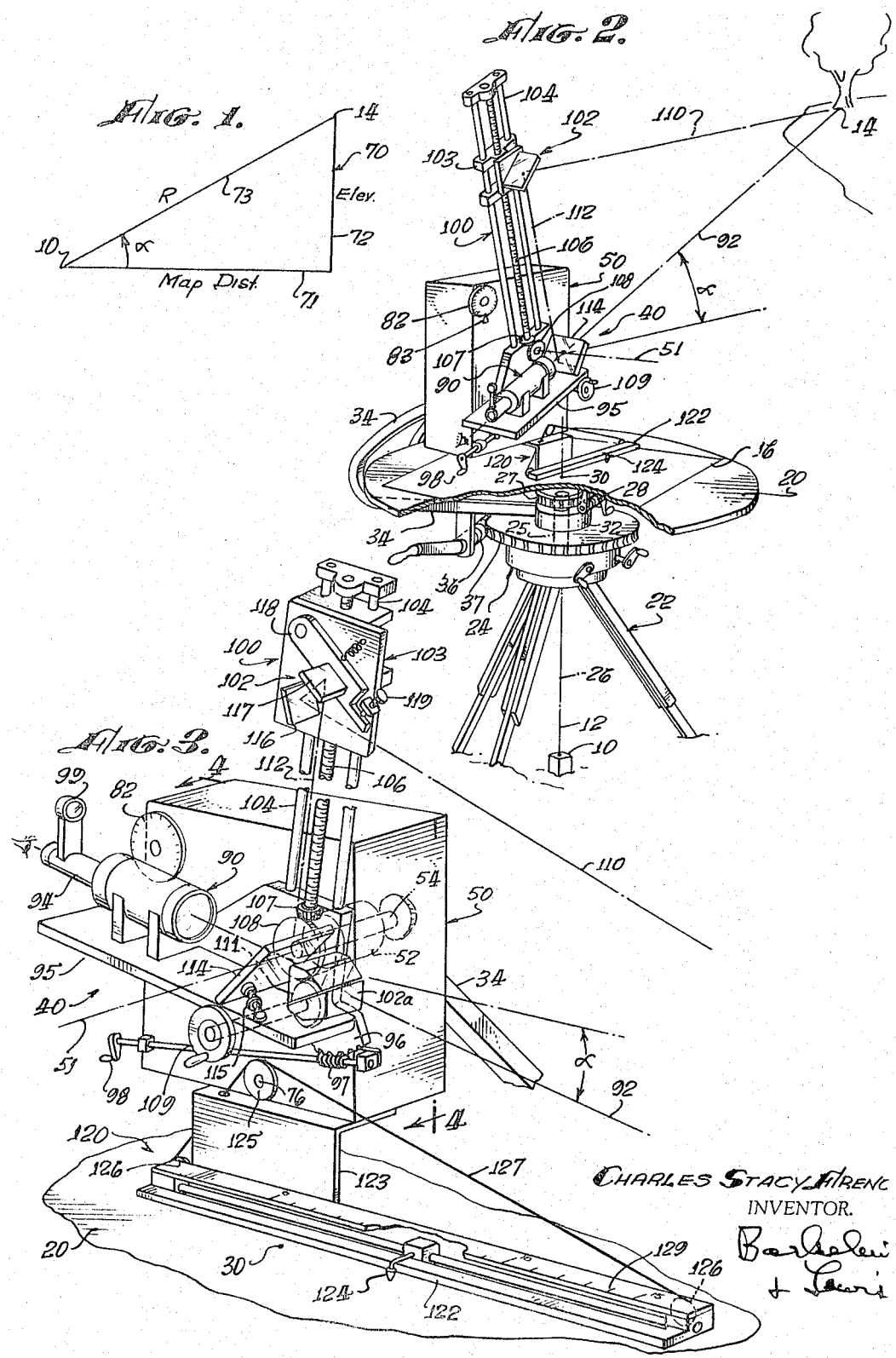

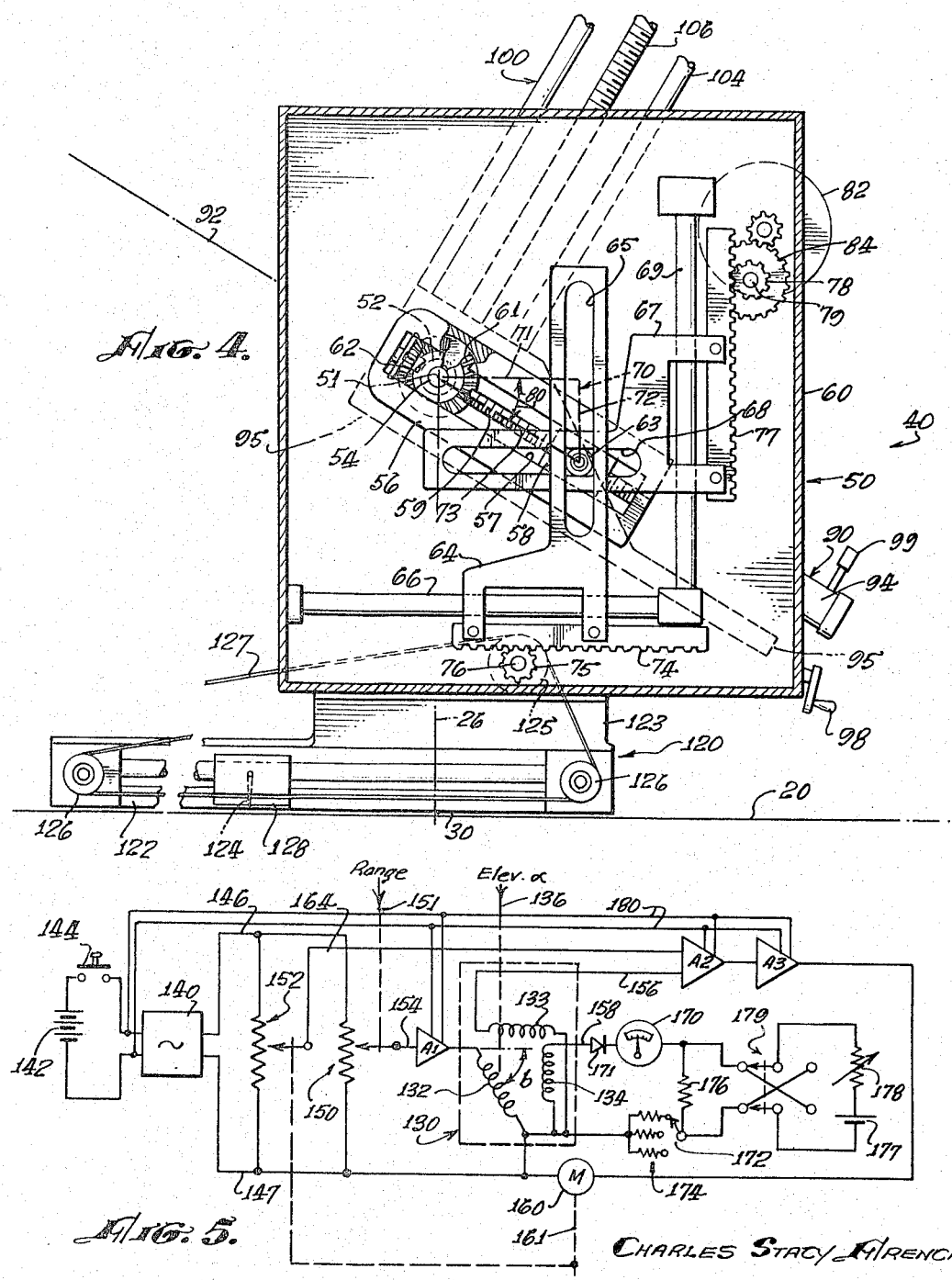

3,302,293
PLANE TABLE PLOTTER
Charles Stacy French, Los Altos Hills, Calif., assignor, by mesne assignments, to Research Corporation, New York, N.Y., a nonprofit corporation of New York
Filed Jan. 20, 1964, Ser. No. 338,841
9 Claims. (Cl. 33—67)

This invention has to do generally with plane table surveying, whereby the correlation between points of a map and points of terrain or the like may be established. The invention is useful both for mapping selected terrain points onto a horizontal map surface, and for locating points on the ground that correspond to selected map points. The invention further permits convenient identification of terrain points that have a common elevation, so that contour lines may be plotted on a map directly from observation of the terrain.

The invention relates more particularly to a plane table plotting system in which the map distances from a selected station to a series of sighted points are determined directly from observation at the station, without requiring any stadia rods or other special equipment at the sighted points. Most sights can therefore be completed and plotted by one man without the services of a rodman or recorder.

That is accomplished, in accordance with the invention, by determining the slope distance to the sighted point by means of a range-finder, and converting the slope distance to true horizontal distance by means of a computing mechanism for solving right triangles. The triangle-solver is preferably automatic in its action, receiving all necessary input information directly from the sighting instrument and range-finder.

In accordance with a further aspect of the invention, the triangle-solver is preferably coupled to a distance indicator on the face of the plane table, so that the map distance to the sighted point is directly indicated on the table without computation of any kind. The azimuth of the sighted point is also preferably indicated automatically on the plane table surface relative to a point representing the sighting station, typically by direct coupling of an indicator to the sighting instrument.

In accordance with a further aspect of the invention, the computing mechanism is arranged to produce an output indication of the difference in elevation between a sighted point and the station point or other elevation base, such as sea level, for example. That elevation difference is typically indicated on a direct reading dial or scale, and can be entered manually on the map.

In accordance with the invention, the computing mechanism or triangle-solver may be of any suitable type capable of receiving two input signals that represent, respectively, an acute angle of a right triangle and the length of the hypothenuse of the triangle; and delivering two output signals that represent the lengths of the triangle sides that are adjacent and opposite, respectively, said acute angle. Many different computing mechanisms are known which are of that general type and are suitable for the present purpose. Such a mechanism may, for example, be entirely mechanical in its construction and operation, receiving input signals in the form of rotary or translational movements and delivering output signals of similar types. Suitable computing mechanisms are also well known that receive information in electrical form and produce electrical output signals. Alternatively, such mechanisms may be arranged to drive mechanical elements such as pointers or scales in accordance with the electrical output signals. The construction and operation of such computing devices, in and of themselves, are not a part of the present invention.

The sighting device, which may typically comprise an optical telescope of known type suitably mounted at the sighting station, is provided with means for producing a signal of appropriate type representing the elevation angle of the sighted point relative to the sighting station. That signal is supplied to the computer as input signal representing the acute angle of the triangle to be solved.

A range-finder is also provided at the sighting station, typically incorporated with the sighting telescope so that the range-finder adjustment is made by reference to images visible in the telescope eyepiece. The range-finder is arranged to produce a signal of appropriate type representing the slope distance to the sighted point. And that signal is supplied to the computer as input signal representing the hypothenuse of the triangle to be solved.

If the computer is of a type requiring a hypothenuse signal that is directly proportional to the length of the hypothenuse, such a signal may be obtained directly from a range-finder of suitable type; or a range-finder producing a non-linear output may be employed, and its output signal converted by an suitable means, electrical or mechanical, into a signal of linear form.

The direction of the sighted point is typically determined on the plane table map is essentially conventional manner by means of an alidade associated with the sighting telescope. For example, the telescope may be rotatable about a vertical axis through the map point representing the sighting station, and may be coupled to a straightedge or other indicating device that is rotatable about that point on the table surface. Alternatively, the direction indicator may be rotatable about the vertical axis through the station point on the map, and may be coupled, as by a linkage, to the telescope, which is rotatable about a parallel but offset axis.

In accordance with a preferred form of the present invention, the map distance is indicated directly on the map, as well as on a distance scale on the instrument. That is typically done by indicating means driven in accordance with the computer output signal that represents the adjacent side of the triangle. Such indicating means typically comprise a stylus movable in translation over the map surface along a straight guideway. The direction of the guideway is preferably controlled automatically by the sighting device in the manner just described for the direction indicator. In fact, the guideway may essentially perform the function of direction indicator. The stylus is then driven along the guideway so that its distance from the station point on the map is proportional to the computer output that represents the adjacent side of the right triangle.

In operation of the instrument in its preferred form, it is sufficient, after setting up the instrument and map at the sighting station, to sight through the telescope upon a desired terrain point, and adjust the range-finder for the line of sight distance of that point. The indicating stylus is thereby positioned automatically over the map point that corresponds to the sighted point, and the relative elevation of the sighted point is indicated directly on an elevation scale. For mapping contour lines, it is possible to map only those points that are found to be at a selected elevation. If the elevation dial shows that a terrain point differs appreciably from that elevation, the telescope may be shifted to an adjacent point that is slightly higher or lower until a point at the desired elevation is located. That point only is actually plotted. In that way points on the desired contour line are successively plotted. Those point may then be connected in the field to yield directly the desired contour map.

The present invention is also useful for identifying terrain features that correspond to selected points of a map previously prepared. For that purpose, the instrument controls can be manipulated to locate the stylus over a selected map point. The telescope is thereby automatically directed at the corresponding terrain point. That procedure greatly facilitates setting out construction stakes, for example.

A full understanding of the invention and of its further objects and advantages will be had from the following description of certain illustrative manners in which it can be carried out. The particulars of that description, and of the accompanying drawings which form a part of it, are intended only as illustration and not as a limitation upon the scope of the invention, which is described in the appended claims.

In the drawings:

FIG. 1 is a schematic diagram illustrating the invention;

FIG. 2 is a perspective view, partially cut away, representing somewhat schematically an illustrative embodiment of the invention;

FIG. 3 is a schematic perspective representing a portion of the device of FIG. 1 at enlarged scale and in modified aspect and position;

FIG. 4 is a section at further enlarged scale, taken on the line 4—4 of FIG. 3 in a plane parallel to the rear face of the case; and FIG. 5 is a schematic diagram representing the computing mechanism of an illustrative electrical embodiment of the invention.

In the illustrative embodiment of the invention shown somewhat schematically in FIGS. 2 to 4, the plane table 20 is mounted in a horizontal plane adjacent one of the terrain points to be mapped. That selected point, which will be referred to as the station point, is indicated schematically at 10. An illustrative terrain point selected as a sighted point is shown at 14, comprising the base of a tree trunk. It is usually convenient to mount table 20 on a tripod 22 by means of a tripod head mechanism indicated schematically at 24. Mechanism 24 may be of conventional type, preferably comprising manual screw adjustments and one or more bubble levels by which the cylindrical post 25 may be oriented with its axis 26 accurately vertical. Table 20 is rotatably mounted on the upper end of post 25 and is adjustable in azimuth angle by manual rotation of the worm 28, which is mounted on the underside of table 20 and engages the worm wheel 27, fixedly mounted on post 25. A compass, not explicitly shown, may be provided for orienting the table and the map 16. The central point 30 of the table surface, defined by axis 26, is ordinarily selected as the map zero, constituting the map representation of station point 10. Ideally, table 20 is set up with axis 26 coinciding with the vertical line 12 through station point 10, and that relation will usually be assumed in the present description for the sake of clarity. However, in actual practice small departures from that relation are usually acceptable and cause only negligible errors in the resulting map. The vertical offset of the apparatus from station point 10 is taken into account in computing relative elevation of the points to be mapped; and a horizontal offset of axis 26 from the station point can be introduced, if convenient, and taken into account on the map in conventional manner.

The sighting and mapping apparatus of the present invention is indicated generally by the numeral 40, and is mounted for rotation about a vertical axis which preferably substantially coincides with axis 26. As shown in the present embodiment, apparatus 40 is rotatably mounted on post 25 independently of table 20 by means of the hub 32 and bracket structure 34, which directly supports the case of computer mechanism 50, to be described. That entire assembly is adjustable in azimuth angle by manual rotation of the worm 36 which is journaled on bracket structure 34 and engages the worm gear 37, fixedly mounted on post 25. Advantages of that general construction are that table 20 and apparatus 40 can be adjusted in azimuth independently of each other, and that the vertical axis 26 maintains a definite position with respect to both. For many purposes, however, it is sufficient to mount apparatus 40 directly on the surface of table 20 in such a way that the sighting mechanism to be described can be rotated about a vertical axis that substantially coincides with axis 26.

Sighting and mapping apparatus 40 comprises the computing mechanism 50, adapted for solving right triangles in a sense to be more fully described; the optical sighting device 90, which establishes the line of sight indicated at 92 and typically comprises a conventional telescope 94 mounted for adjustment about a horizontal axis; the range-finding mechanism 100, which is associated with telescope 94 in a manner to be more fully described; and the plotting mechanism 120 which is controlled, preferably automatically, by computer 50.

The computing mechanism 50 employed in the present embodiment comprises the two coaxial input shafts 52 and 54 suitably journaled on the horizontal axis 51. Outer shaft 52 is a cylindrical sleeve and fixedly carries the radial arm 56. That arm is provided with a radial guideway 57 in which a slider 58 is radially movable under control of the screw 59. That screw is driven via the two bevel gears 61 and 62 from inner input shaft 54. Slider 58 carries a stub shaft parallel to axis 51 on which a roller 63 is freely journaled. The horizontal carriage 64 and the vertical carriage 67 are mounted for translational movement along respective guide rods 66 and 69 which are perpendicular to each other and to axis 51. The carriage movements are driven by roller 63, which engages transverse slots 65 and 68 formed in the respective carriages. The computing mechanism is enclosed in a suitable protective case 60 and is mounted on bracket structure 34 with input axis 51 intersecting vertical main axis 26 perpendicularly, and with carriage 64 movable horizontally and carriage 67 movable vertically, as shown in FIG. 4.

Output signals of mechanical form are developed which represent the respective translational movements of the carriages 64 and 67. As shown, the carriages carry racks 74 and 77 which engage respective pinions 75 and 78 mounted on output shafts 76 and 79.

Computer 50 acts as a triangle resolver for the right triangle indicated schematically at 70 in FIGS. 1 and 4, with horizontal and vertical sides 71 and 72 and with hypothenuse 73 forming an acute angle 80 with horizontal side 71. Angle 80 is determined directly by rotation of arm 56, carried by input shaft 52, and equals the elevation angle alpha of line of sight 92. Angle alpha is zero if line of sight 92 is horizontal, and may be either positive, as in FIGS. 1, 2 and 4; or negative, as in FIG. 3. The length of hypothenuse 73 is determined by rotation of input shaft 54, acting via its drive connection to slider 58 and roller 63. The resulting position of carriage 64 along its horizontal guideway corresponds to the length of triangle side 71 and is represented by rotation of output shaft 76. The vertical movement of carriage 67 corresponds to the length of triangle side 72 and is represented by rotation of output shaft 79. The above described type of mechanical triangle resolver is well known in and of itself, and is illustrative of many known types of resolver.

In accordance with the present invention, the computing mechanism is supplied with input signals such that angle 80 corresponds to the elevation angle alpha of a sighted terrain point, while the length of hypothenuse 73 corresponds to the distance R to that sighted point. When that is done, the output signal at shaft 76 corresponds to the map distance to the sighted point, and may be employed to drive an indicator such as a stylus to indicate that map distance directly on the surface of the plane table. Also, the output signal at shaft 79 corresponds to the elevation of the sighted point. That elevation signal may be read with high accuracy by providing a suitably calibrated dial 82 on the outside of case 60, with index marker 83. Dial 82 is preferably driven from shaft 79 by a gear train 84 which amplifies the movement, thereby facilitating accurate reading of the elevation. A plurality of dials driven at different speeds may be provided if desired. Index 83 may be adjustable about the axis of dial 82, or the dial adjustable on its shaft, to take account of the height of horizontal computer axis 51 above station point 10, or to introduce any selected base, such as sea level, for example, as elevation zero. In particular, any point within the range of the instrument may be used as an elevation base. For instance if a point within range is at a known elevation above sea level the instrument may be sighted on that point, the range-finder adjusted, and then index 83 moved so that dial 82 reads the elevation of that point above sea level. Elevations of other points sighted from station 10 will then all be read directly on the dial as elevation above sea level.

Sighting device 90 comprises the telescope 94, equipped with conventional cross-hairs or their equivalent, and any suitable means for adjustably varying the azimuth angle and the elevation angle of the line of sight 92 from the telescope. In the present apparatus, that adjustment is accomplished by simply rotating the telescope bodily. The telescope is rotatable about vertical main axis 26 with the entire sighting assembly 40; and is also rotatable about horizontal input axis 51 of computer 50. The telescope is typically mounted on a bracket structure, shown somewhat schematically at 95, which is fixedly mounted on the end of input shaft 52 that protrudes from the front of case 60. Bracket 95 and shaft 52 are adjustable about axis 51 by the worm sector 96, fixed to bracket 95, and the worm 97, which is journaled on the case of computer 50 and driven by the crank 98. The telescope axis is alined with guideway 57 in computer arm 56 (FIG. 4), and hence with the hypothenuse 73 of the triangle that is resolved by the computer. The elevation angle alpha of line of sight 92 with respect to the horizontal then equals triangle angle 80. It will be understood without detailed description that line of sight 92 may be directed partially or wholly by reflection from one or more movable mirrors, or prisms, and the mirror movement may then be coupled via suitable gear mechanism to computer input shaft 52 and to the azimuth movement of plotting mechanism 120, to be described. Sighting of the telescope in the present embodiment may be facilitated by an optical peepsight of known construction, as indicated at 99.

Range-finding mechanism 100 comprises a reflective element 102 which is movable in translation along a guideway 104 transverse of line of sight 92. As shown, that guideway comprises two parallel rods fixedly mounted on telescope support 95 and extending approximately perpendicular to line of sight 92 in a vertical plane. Reflective element 102, shown for clarity in FIG. 2 as a single mirror, is more typically an adjustable double mirror analog of a pentaprism. It is mounted on a carriage 103 adapted to slide along the rods 104 under control of the lead screw 106. Bevel gear 107 is fixedly mounted on the lower end of screw 106 and engages the bevel gear 108 which is fixedly mounted on input shaft 54 of computer 50. Manual drive of that input shaft and the lead screw is provided in any convenient manner, as by the crank 109 and the spur gear 111 which engages spur teeth cut on the periphery of bevel gear 108.

Reflective element 102 is preferably enclosed by a protective housing with apertures for the incident and reflected light beams, but that housing is omitted for clarity of illustration. The double mirror analog of a pentaprism shown at 102 in FIG. 3 is known and is not, in and of itself, a part of the present invention. Light from the sighted point 14 (FIG. 1) is reflected successively from the mirrors 116 and 117, emerging along the path 112 essentially parallel to guideway 104. The presence of two reflections makes the angle between rays 110 and 112 depend only upon the angle between the two reflecting faces. It is thus independent of small rotations of the entire assembly 102, so that carriage 103 and guideway 104 are not required to be extremely accurate. The illustrated use of two distinct mirrors has the advantage over a glass pentaprism that the angle between the faces of the two mirrors can be made adjustable for convenience in setting up the apparatus and for varying the map scale. As illustratively shown in FIG. 3, the mirror 116 is fixedly mounted on carriage 103, and the mirror 117 is mounted on the pivoted arm 118 which is adjustable by the screw 119. The mirror mounting and angle adjustment are preferably designed for high accuracy and constructed of material such as Invar having a low coefficient of thermal expansion. The described adjustment of mirror 117 may be replaced or supplemented by providing two optical wedges in the light path which are adjustably rotatable in opposite directions about an axis parallel to the light path. Such a wedge system is particularly useful if it is preferred to use a pentaprism at 102.

Light beam 112 is reflected into telescope 94 by the partially reflecting mirror 114, which is mounted on telescope support 95 with its reflecting face preferably substantially on the computer input axis 51. Mirror 114 is mounted at essentially 45° to the line of sight 92, and may be adjustable about an axis parallel to 51, as indicated schematically at 115. Two images of terrain point 14 are then visible in the telescope, one formed by direct rays received along line of sight 92 and transmitted through the partially reflecting mirror 114, and one formed by the rays 110 reflected first by reflective element 102 and then by mirror 114. Since the double mirror device 102 inverts the second of those images, suitable means must be provided for inverting the first image, or for restoring the second image to normal position. As shown in FIG. 3, a Pechan prism arrangement is inserted at 102a on line of sight 92 ahead of mirror 114. This known system has the property of inverting the image without reversing left and right. Furthermore, the entering and emerging beams are not displaced either laterally or vertically. With that arrangement, telescope 94 may have a simple, non-erecting eyepiece. Alternatively, the Pechan prism, or its equivalent, might be placed in the beam 112, and telescope 94 provided with an erecting eyepiece.

For any given line of sight distance to object 14 within the range of the instrument, the two telescope images coincide for some position of carriage 103. That carriage position is a linear measure of the distance, the factor of proportionality depending upon the angle between rays 92 and 110. Thus the scale of the range signal is adjustable by variation of that angle, as by adjustment of mirror 117 at 119, or of mirror 114 at 115. The two images seen in the telescope are preferably of different color. For example, a dichroic coating of known type on mirror 114 makes the transmitted image orange and the reflected image blue. At coincidence, the combined image has its normal color.

In operation of the described range-finding mechanism, the distance to sighted point 14 is directly proportional to the distance from axis 51 to the crossing point of the lines of sight 110 and 112 within mirror assembly 102. Due to that direct proportionality, it is feasible to drive the range input to computer 50 directly with the range-finder adjustment, as by the gear coupling already described. Since the entire range-finder mechanism is mounted on telescope support 95 and rotates with the telescope and with computer arm 56 about axis 51, the described range input connection is not disturbed by that rotation.

Plotting mechanism 120 comprises the guideway 122, which is fixedly mounted by means of the bracket 123 on the case of computer 50, and hence effectively on bracket 34. Guideway 122 is parallel to, and just above, the working surface of table 20, and is parallel to the vertical plane through the telescope line of sight 92. The pointer of index 124 is slidable along the guideway, and is preferably arranged to make a mark on the map at a definite position when depressed manually or otherwise. The movement of index 124 along the guideway is driven in accordance with the movement of horizontal carriage 64 of computer 50. That drive is preferably automatic via coupling mechanism of any suitable type. An illustrative mechanical coupling is represented in the present embodiment by the pulley 125, fixedly mounted on computer output shaft 76, and the flexible cable 127. Cable 127 encircles pulley 125 and passes over the idler pulleys 126, which are mounted at opposite ends of guideway 122. Index 124 is connected to the run of cable 127 that is parallel to the guideway, preferably by a clamp 128 or other device providing convenient adjustment of the index longitudinally of the cable. That adjustment is so set that the index distance from map zero 30 is directly proportional to the distance of roller 63 of computer 50 (FIG. 4) from axis 51.

The scale of the index movement is selected to produce the desired scale of map 16. That scale may be varied in definite steps, for example, by changing the diameter of pulley 125. Continuous variation of the map scale is conveniently available optically by changing the angle between the light beams 92 and 110, as already described. The map distance is preferably indicated visually as by the scale 129 marked on guideway 122. That scale is particularly convenient for adjusting the range-finding mechanism by reference to an object at known distance from the instrument.

In operation of the described embodiment for plane-table mapping, the apparatus is first set up with axis 26 vertical and in the desired relation to station 10. Map 16 is placed on table 20 with the map zero at axis 26, and the table is rotated to orient the map correctly, usually with respect to magnetic north. Telescope 94 is then sighted on a selected sighting point, such as 14, and range-finder 100 is adjusted by crank 109 to bring the two images into coincidence. Index 124 is thereby positioned accurately at the map position corresponding to terrain point 14. That point is marked on the map, typically by depressing index 124. The elevation of point 14 relative to station 10 or to another desired elevation base is read on dial 82 and recorded, directly on the map or elsewhere as desired. The telescope is then sighted on the next sighting point, and so on, until all points to be sighted from station 10 have been recorded.

When contour lines are to be plotted, the present apparatus permits direct identification of terrain points having a common elevation. For that purpose, the telescope and range-finder are set on a point selected as having approximately the desired elevation. Reference to the elevation dial then shows whether the selected point is at the desired elevation. If correction is required, the telescope is shifted to a higher or lower point, and this process is repeated until a point at the desired elevation is located. That point only is then plotted. By this procedure only points actually on the desired contour line need to be plotted, and the line can be drawn directly in the field.

The described apparatus is also useful for locating terrain points that correspond to selected points of a map previously prepared. The map is placed on the table with axis 26 at the map point that corresponds to the instrument location. The map is then oriented in azimuth by sighting on any readily identifiable object shown on the map. The telescope and range-finder can then be manipulated to bring the index point 124 to a desired map point and to bring elevation dial 82 to the proper reading to take account of elevation differences shown on the map. The telescope crosshairs then directly identify the terrain point that corresponds to the selected map point. Points essentially on the same line of sight but at different distances are clearly distinguished by the range-finder images, which coincide only for objects at the correct range. This procedure is particularly convenient for setting construction stakes, or for laying out on the ground any configuration that has been previously drawn on a map.

FIG. 5 represents an embodiment of the invention that utilizes signals of electrical form, rather than mechanical signals as in the previously described embodiment. The computing mechanism of FIG. 5 utilizes a precision electrical resolver such, for example, as that manufactured by Reeves Instrument Corporation under the identifying number R601, Model 152H. Such a resolver is represented schematically at 130, comprising a wound rotatable rotor 132 and two stator windings 133 and 134 mounted at right angles to each other. An alternating current I in rotor winding 132 induces in stator winding 133 a current $I \cos b$, and induces in stator winding 134 a current $I \sin b$, where $b$ represents the angular deflection of the rotor from zero position. The rotor shaft is coupled to the sighting mechanism in such a way that rotor angle $b$ is equal to elevation angle alpha of the line of sight. That coupling is indicated schematically by the dashed line 136, and is typified by direct connection of the rotor shaft to shaft 52 of FIG. 3 on which the telescope is mounted.

A convenient electrical power source for operating the system of FIG. 5 comprises the conventional transistor oscillator 140, typically operating at 400 cycles per second with power from a portable battery 142. The control switch 144 is connected in series with battery 142 and is typically of push-button type. Whenever switch 144 is closed, oscillator 140 supplies alternating current at essentially constant voltage via the lines 146 and 147 to the range-finder potentiometer 150 and to the reference potentiometer 152; and direct current power is supplied via the lines 180 to the amplifiers indicated schematically at A1, A2 and A3.

The wiper of range-finder potentiometer 150 is driven by means indicated schematically at 151 in accordance with the slant distance to the sighted station. If a range-finder of the type shown at 100 in FIGS. 2 to 4 is employed, drive 151 may represent direct mechanical connection of the potentiometer wiper to shaft 54, for example, with suitable gearing. The amplitude of the output signal on the line 154 from potentiometer 150 is then directly proportional to the range to the sighted station. If it is preferred to employ a range-finder that does not itself produce a signal directly proportional to the distance, a linearizing mechanism of any suitable type such as a cam, for example, may be connected in the drive 151 between the range-finder and potentiometer 150. The signal from 150 is preferably amplified by A1, the resulting signal current being supplied directly to rotor winding 132. With that arrangement, the output signal on the line 156 from stator winding 133 is a voltage proportional to the desired map distance to the sighted station, and the output signal on the line 158 from stator winding 134 is a voltage directly proportional to the elevation of the sighted point relative to the instrument position.

The map distance signal on line 156 might be indicated by a suitable meter of visual type, and the distance entered on the map manually. In the present embodiment, however, the signal at 156 is supplied as control signal to a servo drive mechanism which is coupled directly to an index marker, typically similar to index 124 of FIGS. 2 to 4. That servo drive is typically of conventional type and comprises a servo motor indicated at 160, which is coupled to the index, as indicated schematically at 161, for example via a pulley and flexible cable such as are shown at 125 and 127 of the previous embodiment. Motor 160 also drives the wiper of reference potentiometer 152, producing on the line 164 a reference signal that corresponds to the index position. That reference signal and the map distance signal from line 156 are supplied in opposite phase as differential inputs to the servo amplifier A2. The output from A2, corresponding to the error in setting of the index, is supplied as control signal to power amplifier A3. The output from A3 drives servo motor 160.

The elevation signal on line 158 is typically rectified by the diode 171 and supplied to the voltmeter 170, which may be calibrated directly in feet. The switch 172 permits any one of the resistances 174 to be inserted in series with meter 170 to vary the scale of the meter indication. A bucking circuit is preferably provided to permit the effective zero of the elevation meter to be set at any desired value, as to compensate the elevation difference between the instrument and station point 10 (FIG. 2), or to set the elevation indicator at a desired zero such as sea level. As shown, that bucking circuit comprises the resistance 176, connected in series with meter 170, and the series connected voltage source 177 and variable resistance 178. The double pole, double throw switch 179 permits connection of 177 and 178 in shunt to resistance 176 in the desired polarity. Resistance 178 may be calibrated directly in feet of elevation difference.

In operation of the system of FIG. 5, the telescope is sighted on the desired terrain point, and the range-finder is adjusted in essentially the manner already described. Power is then supplied momentarily to the electrical system by depressing button 144. The amplifiers are thereby energized, registering the elevation difference of the sighted point on meter 170 and causing the servo system to drive the plotting index to the correct map position. All amplifiers preferably use transistors rather than vacuum tubes to reduce current drain and to avoid delay for warm-up time when the system is energized. In practice, meter 170 can be read as soon as the servo drive has reached equilibrium position, so that only brief energization of the system is required for recording each sighted point.

In the embodiment of FIGS. 2 to 4 the mechanical triangle solver 50 may be mounted independently of the sighting mechanism, if desired, the two input signals being supplied to it and the map distance signal received from it in suitable manner, as by flexible cables, for example, or by electrical followup means of known type. In the electrical system of FIG. 5 the parts that need to be associated with the sighting system may be particularly light and compact, and the electrical form of the signals greatly facilitates remote mounting of different parts of the system as may be desired for convenience of design and operation.

It will be understood that many modifications may be made in the particulars of the described embodiments without departing from the proper scope of the invention, which is defined in the appended claims.

In particular, the alternating current resolver indicated at 130 may be replaced by such known equivalents as a sine-cosine potentiometer, which may be energized by either alternating or direct current. Electrical computers are known which utilize input signals directly proportional to the hypothenuse and to one acute angle of a right triangle and develop signals representing the respective sides of the triangle; and such signals may be of either analog or digital form. Means are known for developing such signals for supply to a computer, such, for example, as conventional digital encoders, and may be coupled directly to the horizontal axis of the telescope movement and to the mirror movement of the range-finder. The systems that have been described may be divided into two or more portions that are remote from each other and are connected by conventional signal transmitting systems of any desired type, such as mechanical cable, electrical wires, or radio transmission. Signals of digital form are known to be particularly convenient for wire or radio transmission.

I claim:
1. A system for correlating points of terrain or the like and corresponding points of a map, comprising in combination
   optical means manually adjustable to establish a line of sight between two of said terrain points,
   range-finder means directionally coupled to said optical means and responsive to the line of sight distance between said two points,
   computing mechanism comprising means for receiving a first input signal representing one acute angle of right triangle, means for receiving a second input signal representing the length of the hypothenuse of the right triangle, and means for deriving from said input signals an output signal representing the length of the side of the right triangle adjacent said acute angle,
   means coupled to said optical means for developing a representation of the elevation angle of the line of sight and for supplying that representation as first input signal to the computing mechanism,
   means coupled to said range-finder means for developing a representation of the line of sight distance between said two points and for supplying that representation as second input signal to the computer mechanism,
   structure forming a map surface,
   and means responsive to said output signal of the computing mechanism for directly indicating on the map surface a distance proportional to the map distance between said two points.

2. A system as defined in claim 1, and wherein said computing mechanism includes means for producing a second output signal representing the length of the side of said right triangle opposite said acute angle,
   said system including means responsive to the second output signal for indicating the difference in elevation of said two points.

3. A system for correlating points of terrain or the like and corresponding points of a map, comprising in combination
   a plane table adapted to be mounted with its surface horizontal adjacent one of said terrain points,
   optical sighting means adapted to be mounted adjacent said one point and adapted for establishing a line of sight, said sighting means comprising azimuth means adjustable to rotate the line of sight with respect to a vertical axis and elevation means adjustable to rotate the line of sight about a horizontal axis that substantially intersects said vertical axis, whereby to align the line of sight with another of said terrain points,
   range-finder means directionally coupled to said optical sighting means and responsive to the distance along said line of sight to said other point,
   computing mechanism comprising means for receiving a first input signal representing one acute angle of a right triangle, means for receiving a second input signal representing the length of the hypothenuse of the right triangle, and means for deriving from said input signals an output signal representing the length of the side of the right triangle adjacent said acute angle,
   means coupled to the elevation means for supplying to the computing mechanism a first input signal proportion to the elevation angle of the line of sight,
   means coupled to the range-finder means for supplying to the computing mechanism a second input signal proportional to the length of the line of sight,
   a map point indicator mounted for radial and rotational movements over the plane table surface with respect to a map zero,
   means for driving the radial movement of the point indicator under control of said output signal of the computing mechanism to make the radial distance of the point indicator from said map zero proportional to the map distance between said two points,
   and means for driving the rotational movement of the point indicator under control of said azimuth means to make the line from said map zero to the point indicator correspond to the map direction of said second second point from said first point.

4. A system as defined in claim 3, and wherein said computing mechanism includes means for producing a second output signal representing the length of the side of said right triangle opposite said acute angle,
said system including means responsive to the second output signal for indicating the difference in elevation of said two points.

5. A system for correlating points of terrain or the like and corresponding points of a map, comprising in combination
optical means manually adjustable to establish a line of sight between two of said terrain points,
range-finder means responsive to the line of sight distance between said two points,
an electrical resolver having a rotatable rotor winding and at least one stator winding,
means coupled to said optical means for driving the rotation of the rotor winding in accordance with the elevation angle of the line of sight,
means coupled to said range-finder means for supplying to the rotor winding an alternating current signal of amplitude proportional to the line of sight distance between said two points,
structure forming a map surface,
and means responsive to the voltage induced in the stator winding for directly indicating on the map surface a distance proportional to the map distance between said two points.

6. A system for correlating points of terrain or the like and corresponding points of a map, comprising in combination
a plane table adapted to be mounted with its surface horizontal adjacent one of said points,
computing mechanism comprising first and second coaxial input shafts drivable in accordance with one acute angle and with the length of the hypothenuse of a right triangle, respectively, and an output shaft driven under control of said input shafts in accordance with the length of the side of the right triangle adjacent said acute angle,
means mounting said computing mechanism for pivotal movement about a vertical axis intersecting the table surface and with the axis of said input shafts perpendicular to said vertical axis and substantially intersecting the same,
optical sighting means mounted on said first input shaft of the computing mechanism for rotation therewith and adapted for establishing a line of sight perpendicular thereto to another of said points,
range-finder means adjustable in accordance with the length of said line of sight to said other point,
means for driving said second input shaft of the computing mechanism under control of the range-finder means and in proportion to the length of said line of sight,
a map point indicator mounted for rotational movement with the computing mechanism about said vertical axis and for radial movement with respect to that axis in a plane through that axis and parallel to the line of sight,
and means for driving the radial movement of the point indicator under control of the output shaft of the computing mechanism to indicate the map point corresponding to said other point.

7. A system for correlating points of terrain or the like and corresponding points of a map, comprising in combination
optical means manually adjustable to establish a line of sight between two of said terrain points,
range-finder means directionally coupled to said optical means and responsive to the line of sight distance between said two points,
means coupled to the range-finder means for producing an electrical signal representing said line of sight distance,
electrical means responsive to said signal and coupled to said optical means for producing two output signals proportional, respectively, to the map distance between said two terrain points and to the difference in elevation of said two terrain points,
and output means responsive to the respective output signals and acting to indicate visually the magnitude of said map distance and elevation difference.

8. A system for correlating points of terrain or the like and corresponding points of a map, comprising in combination
means adapted to be mounted adjacent one of said terrain points and establishing a station point corresponding thereto,
sighting means actuable to produce a first signal that represents the elevation angle of another of said terrain points with respect to the station point,
range-finder means actuable independently of the sighting means actuation to produce a second signal that represents the line of sight distance of said other terrain point from the station point,
computing mechanism actuable under control of said first and second signals to develop an output signal that represents the horizontal distance of said other terrain point from the station point,
structure forming a map surface including a station point representation,
and means driven under control of said output signal for directly indicating on the map surface a distance from the station point representation proportional to said horizontal distance.

9. A system as defined in claim 8 and wherein said second signal is directly proportional to the line of sight distance of said other terrain point from the station point,
said range-finder means including means actuable to vary the constant of proportionality between said second signal and the line of sight distance.

References Cited by the Examiner
UNITED STATES PATENTS

| | | | |
|---|---|---|---|
| 2,071,444 | 2/1937 | Wellington | 33—65 X |
| 2,294,195 | 8/1942 | Miller | 88—2.7 |
| 2,448,965 | 9/1948 | Drayer | 33—71 |
| 2,618,067 | 11/1952 | Grondona | 33—20 |

LEONARD FORMAN, *Primary Examiner.*

WM. K. QUARLES, JR., *Assistant Examiner.*